Nov. 26, 1968

N. ZWIEBEL 3,412,430

CONVEYOR INDEXING APPARATUS

Filed Dec. 5, 1966

INVENTOR.
NORMAN ZWIEBEL
BY Roberts & Cohen
ATTORNEYS

Nov. 26, 1968  N. ZWIEBEL  3,412,430
CONVEYOR INDEXING APPARATUS
Filed Dec. 5, 1966  6 Sheets-Sheet 2

INVENTOR
NORMAN ZWIEBEL
BY
Roberts + Cohen
ATTORNEYS

INVENTOR
NORMAN ZWIEBEL
BY
Roberts + Cohen
ATTORNEYS

Nov. 26, 1968   N. ZWIEBEL   3,412,430
CONVEYOR INDEXING APPARATUS
Filed Dec. 5, 1966   6 Sheets-Sheet 6

INVENTOR.
NORMAN ZWIEBEL
BY
Roberts & Cohen
ATTORNEYS

United States Patent Office 3,412,430
Patented Nov. 26, 1968

3,412,430
CONVEYOR INDEXING APPARATUS
Norman Zwiebel, Bayside, N.Y.
(132—29 33rd Ave., Flushing, N.Y. 11354)
Continuation-in-part of application Ser. No. 484,048,
Aug. 31, 1965. This application Dec. 5, 1966, Ser.
No. 630,778
23 Claims. (Cl. 18—19)

ABSTRACT OF THE DISCLOSURE

A conveyor chain drive in which a piston drives a rack which in turn drives a pinion, a stop being provided for the rack and being adjustable according to the pitch of teeth on the rack.

---

This application is a continuation-in-part of material divided from my earlier application Ser. No. 484,048 filed Aug. 31, 1965, now Patent No. 3,335,927.

This invention relates to conveyor indexing apparatus and more particularly to apparatus for the delivery of sheet materials and the like to spaced processing stations situated in serial fashion along a continuous path.

In the processing of materials such as thermoplastic sheets, it is conventional to employ conveyor means for automatically moving the sheets through a series of processing stations. Since these processing stations usually perform related operations, it is essential that the sheets be carefully registered at each station so that an operation at one station will be coordinated with an operation at another station.

By way of example, a sheet of thermoplastic material which has been duly heated may be stamped at a first station into a plurality of articles such as plastic drinking cups which are severed from the sheet at a subsequent station. Obivously, if the severing operation is not properly aligned with the stamping operation, the thusly formed articles may be cut or mangled so that the sheet becomes worthless.

It is accordingly one of the broad objects of the invention to provide means whereby a sheet as referred to above can be appropriately carried through a sequence of stations and accurately registered therein.

This problem of registration is, however, not a new problem and there have been various devices known and constructed heretofore which are directed to achieving proper registration. Some known solutions provide, for example, abutments at each station for effecting registration. This approach is somewhat limited in nature because, in order to effect changes, it is essential to adjust the abutments at each of the processing stations which can be tedious and uneconomical when a multitude of stations are involved.

In this respect, it is an object of the invention to provide for adjusting registration through the conveyance means so that a single adjustment may be effective throughout the entire system.

Adjustment of registration is by no means the sole characteristic of the invention and, in fact, this feature may sometimes be of little or no consequence in systems in which the invention is employed. More particularly, the invention, as will be seen, provides a conveyor drive which may find many and varied applications not all of which require registration requirements. It is accordingly a further object of the invention to provide, with or without reference to registration requirements, an improved conveyor drive.

Briefly, the invention, as will be explained in greater detail hereinafter, provides an improved conveyor drive involving the use of a force which is terminated finally and accurately by bringing it against a fixed but adjustable stop. As will appear hereinunder, the force may be transferred to the associated conveyor or other device which is to be driven through the intermediary of a rack and pinion arrangement whereof the rack is oscillated longitudinally. The rack and pinion may be engaged in one direction of movement of the rack and disengaged on return movement thereof.

According to one constructional feature of the invention, the rack may be moved out of engagement with the pinion, or vice versa, on said return movement. According to another constructional feature, the above-noted stop is employed to limit movement of the rack and is adjustable incrementally according to the pitch of the teeth on the rack and/or pinion.

The above objects and features of the invention, as well as advantages thereof, will become more particularly apparent from the following detailed description of some preferred embodiments of the invention as illustrated in the accompanying drawing, in which:

Figure 1:
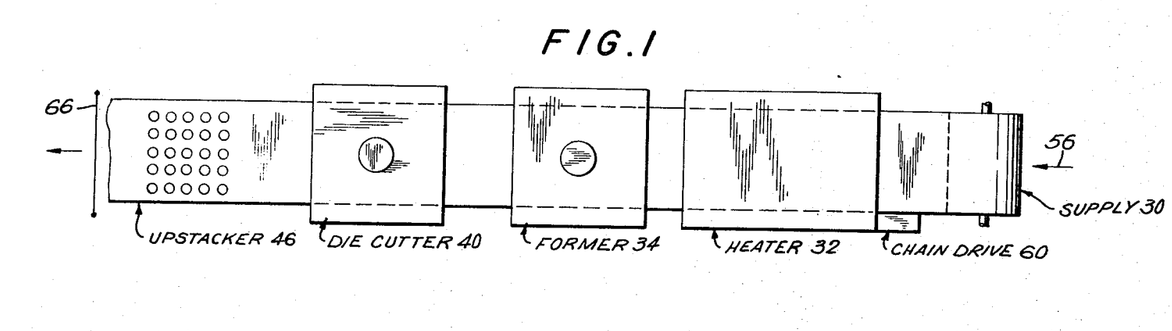
FIGURE 1 is a diagrammatic top plan view of an apparatus contemplated in accordance with the invention.
Figure 2:
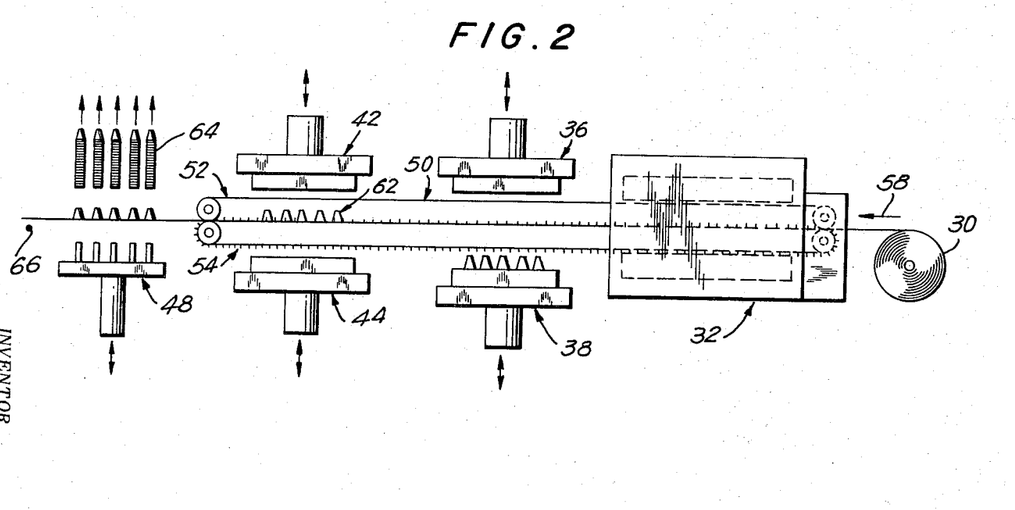
FIGURE 2 is a side view of the apparatus of FIG. 1.

Referring now to FIGS. 1 and 2, it will be seen that a general apparatus which may be related to the invention may comprise generally a source 30 of sheet material, a heater 32, a former 34 including an upper member 36 and a lower member 38, a die cutter 40 including an upper member 42 and a lower member 44, and a stacking zone 46 inclusive of a reciprocal stacking element 48.

Said apparatus, moreover, comprises a chain conveyor 50 which, as illustrated in FIG. 2, includes an upper endless chain 52 and a lower endless chain 54, although as will be hereinafter seen, a single chain on at least one of the opposite lateral edges of the sheet may also be employed.

The sheet generally travels through the above apparatus in the direction indicated by arrows 56 and 58 and is engaged by the conveyor by means to be subsequently described in detail, the chain being driven by the diagrammatically indicated chain drive 60, the details of which will also appear hereinafter.

The sheet travels sequentially from the heater 32 to the former 34, whereat three-dimensional protrusions are formed in the sheet on either or both sides of the plane of the sheet, such three-dimensional protrusions appearing in FIG. 2 as indicated at 62.

In the die cutter 40, the three-dimensional protrusions which constitute the formed articles produced in the apparatus of the invention, are partially severed from the sheet by operation of platens 42 and 44, the sheet thence traveling to the stacker 46, whereat through the operation of stacker element 48 the articles are displaced upwardly into stacks 64.

Finally, in order to sever the remaining waster material from the oncoming sheet subsequently moving to terminal processing, there is provided a thermally effective wire cut-off 66.

Figure 3:
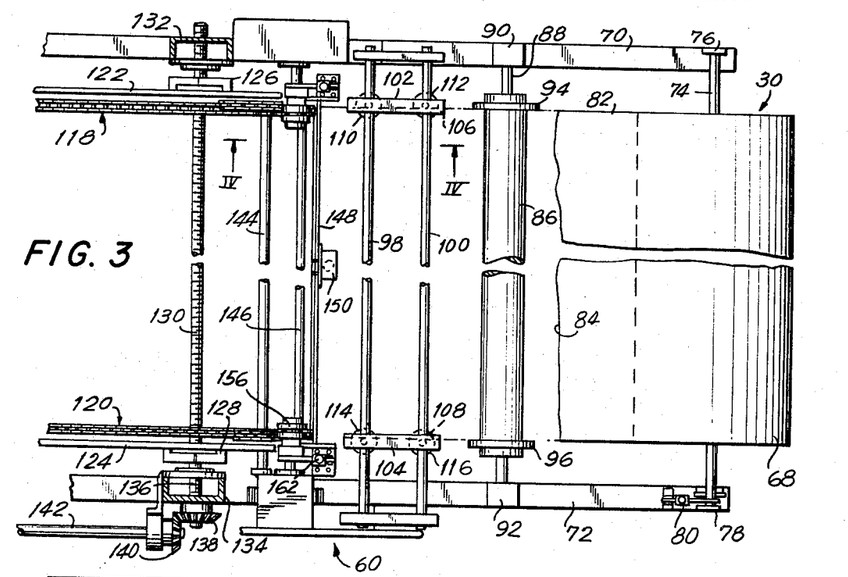
FIGURE 3 is a top plan view of the portion of the apparatus constituting the supply for the sheet material to be used for processing.

In FIG. 3 are illustrated in greater detail some of the elements of the above-listed apparatus and orientation may be taken from the supply 30 which is perferably in the form of a roll 68 of thermoplastic sheet material such as, for example, a foam polystyrene sheet, which is mentioned by way of illustration and not by way of limitation.

As is also seen in FIG. 3, the apparatus consists of a frame including lateral side members 70 and 72, the roll 68 being supported on a shaft or rod 74 which extends transversely of the sides 70 and 72. Rod 74 may be accommodated in a bushing 76 on the one side and in a bushing 78 on the other side. A lock 80 may be provided to retain the rod 74 fixed in position and/or to act as a brake. At 82 is indicated the sheet withdrawn from the roll 68. The sheet is broken off at edge 84 to expose some of the other elements or the apparatus for purposes of explanation.

For example, an idler roll 86 is provided which is traversed by the sheet 82, said idler roll being supported on a rod shaft 88 which is parallel to the rod 74 and is supported in bushings 90 and 92. The shaft 88, moreover, supports two axially adjustable discs 94 and 96 of greater diameter than the idler roll and aligned perpendicularly thereto. The discs 94 and 96 function to restrict lateral movement of the sheet 82 as it moves across said idler roll.

Extending between the sides 70 and 72 are rods 98 and 100. These rods in turn support guide brackets 102 and 104 through which extend the open slots 106 and 108 longitudinally aligned therein. Mounted on the guides 102 and 104 are the lock screws 110, 112, 114 and 116 which function to lock the guides in position on the rods 98 and 100.

The sheet 82 passes through slots 106 and 108 to the chain conveyor of which the spaced lateral sections 118 and 120 now appear. Side supports 122 and 124 are provided to support sections 118 and 120 and these in turn are supported on a plurality of brackets longitudinally disposed along the apparatus and of which brackets 126 and 128 appear in FIG. 3.

Said brackets are supported on the threaded rod 130, journaled in bushings 132 and 134 respectively mounted in sides 70 and 72. On the end 136 of rod 130 there is mounted a bevel gear 138 mating with a second bevel gear 140 mounted on a rod 142 extending longitudinally along side 72 and in parallel therewith. Bevel gear 140 is exemplary of a plurality of such bevel gears in turn associated with gears similar to bevel gear 134 so that rotation of rod 142 controls the spacing of a plurality of brackets 126 and 128 lonigtudinally distributed through out the apparatus, whereby the spacing of sides 122 and 124 may be readily controlled to adjust conveyor sections 118 and 120 to varying widths of sheets to be processed.

On the extremities of shafts 144 and 146 are mounted the rotatable sprockets which drive chains 118 and 120. On these shafts are also supported the gears or pinions by means of which the aforesaid sprockets are driven.

The chain drive 60 referred to above with reference to FIGS. 1 and 2 also appears in FIG. 3, and the details of this mechanism which relate to the invention will be shown in greater detail hereinafter.

Previously mentioned was the use of a wire 66 by means of which the scrap remainder of the sheet could be removed from the oncoming sheet still being processed. The equivalent of this wire appears in a second such wire 149 which is an emergency hot wire cut-off controlled through the intermediary of solenoid 150 to provide for severing the sheet at the feed-in section of the apparatus in the event of an emergency.

Figure 4:
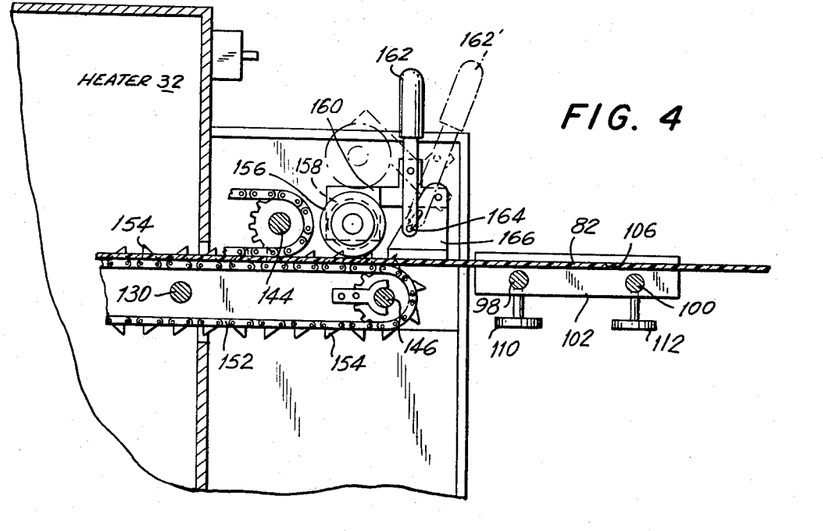
FIGURE 4 is a side view illustrating the apparatus employed for engaging the sheet to be processed with a chain conveyor.

FIG. 4 illustrates partially in section and in side view a portion of the apparatus shown in FIG. 3, FIG. 4 being intended to supply the details of a means through which the sheet can be positively engaged with the chain conveyor. For purposes of explanation, the conveyor is illustrated in the form of a single chain 152 on which are mounted a plurality of teeth or pins 154 which are intended to penetrate the sheet being processed so that a forward motion can be positively imparted to the same.

The sheet passes, for example, through the slots in brackets 104 and 106 of FIG. 3, of which only the slot 106 appears in FIG. 4 by reason of the fact that the front bracket 104 has been omitted for purposes of simplification. The sheet 82 thence passes to the chain 152 which has superposed with respect thereto a roll or disc 156 having therein an annular groove 158 adapted to accommodate teeth 154 therein. Disc 156 is mounted on a block 160 in turn mounted on lever 162 pivotal on a pin 164 mounted on bracket 166 supported on the frame of the apparatus. Lever 162 is pivotal to position 162′, in which event the disc 156 is withdrawn from the chain 152 and sheet 82 can be juxtaposed with respect thereto.

Once sheeet 82 is juxtaposed relative to chain 152, lever 162 is returned to its normal position, carrying along with it disc 156, trapping the lateral edges of the sheet 82 against the chain 152 in such a manner that teeth 154 penetrate the sheet and make positive engagement therewith. When initial engagement has been established, further engagement is self-perpetuating as the teeth moving into engagement with the sheet will effectively penetrate the same.

Although one form of apparatus for engaging a sheet with the conveyor has been shown, many other forms are possible for use with the apparatus of the invention.

Figure 5:
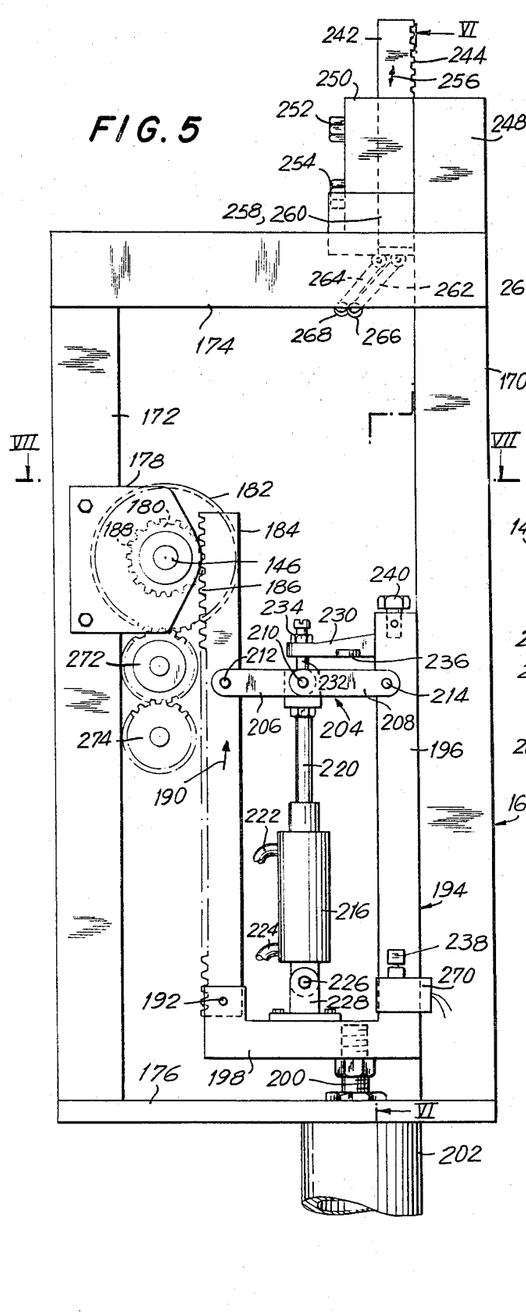
FIGURE 5 is a side view illustrating the improved conveyor drive mechanism of the invention in one condition thereof.
Figure 6:
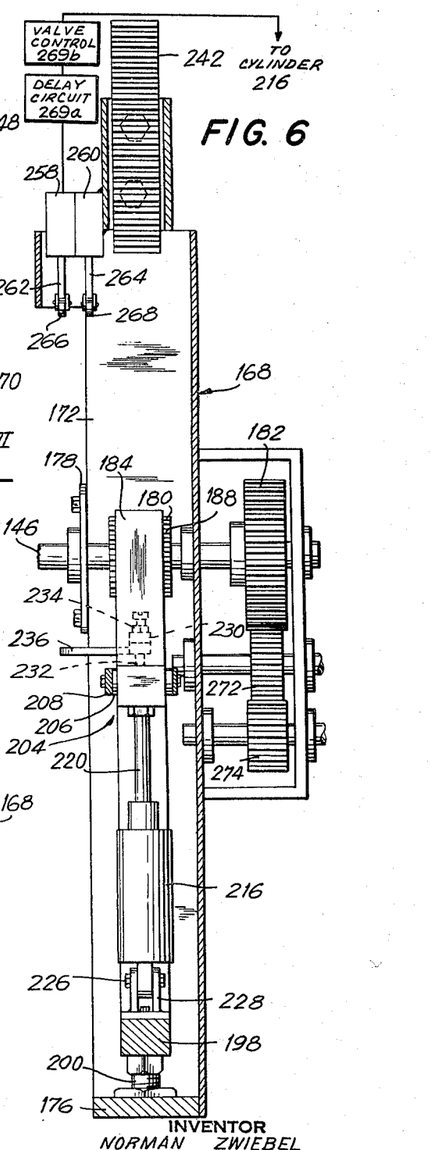
FIGURE 6 is an end view of the apparatus of FIG. 5.
Figure 7:
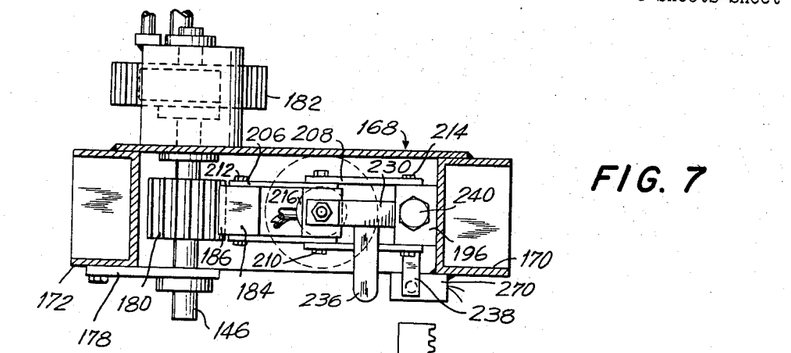
FIGURE 7 is a top view of the apparatus of FIG. 5 with the upper portion thereof removed.

With reference to FIG. 3, there has been described a shaft 146 by means of which was rotated the gear or pinion through which the chain driving sprockets of the conveyor system were in turn driven. Shaft 146 also appears in FIGS. 5–8, wherein appears one of the preferred chain drive systems of the invention. In FIGS. 5 and 6 particularly there appears a frame 168 fixedly supported on the side 72 of the main frame of the apparatus. Frame 168 consists of uprights 170 and 172 and of horizontal elements 174 and 176 extending between said uprights. The shaft 146 passes through the bearing 178 mounted on upright 172. Mounted on shaft 146 is a pinion or gear 180, as well as a second pinion or gear 182.

An elongated rectilinear rack 184 is provided which has a rectilinear series of teeth 186. Said teeth selectively engage with the teeth 188 on pinion 180 and, when the rack is displaced in the direction indicated by arrow 190, the pinion 180 is rotated.

Rack 184 is, through the intermediary of a pivot pin 192, pivotally supported on a frame 194 constituted by an upright 196 and a horizontal member 198. Frame 194 is mounted on a piston rod 200 accommodated in a jack 202, the rod 200 being shown in extension in FIG. 8.

Connected between upright 196 and rack 184 is a toggle 204 consisting of links 206 and 208 pivotally connected together by a pin 210 and pivotally connected to rack 184 and upright 196 respectively by pins 212 and 214.

Figure 8:
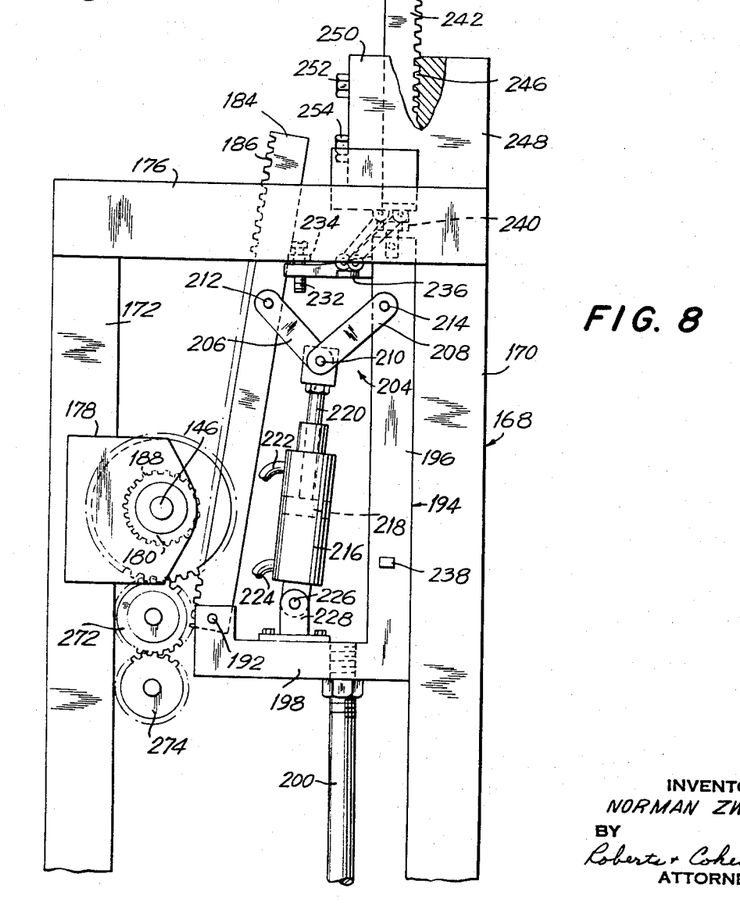
FIGURE 8 shows a second condition of operation of the apparatus of FIG. 5.

The lengths of links 206 and 208 are such that when the links are rectilinearly aligned and the toggle is at maximum extension, the teeth 186 of rack 184 are in engagement with teeth 188 on pinion 180. However, when the links 206 and 208 are pivoted relative to one another, as shown in FIG. 8, the rack 184 is pivoted on pin 192 and drawn out of engagement with pinion 180.

Controlling the operation of toggle 204 is a piston and cylinder arrangement comprising a cylinder 216 accommodating a piston 218 to which is connected a piston rod 220. The rod 220 is connected to pin 210. Consequently, the position of piston 218 in cylinder 216 controls the operation of toggle 204. In turn, the position of piston 218 is controlled by means of lines 222 and 224 which feed in or evacuate a pressure fluid from cylinder 216.

It will be noted that the cylinder 216 is pivotally mounted on a pin 226 in turn supported in a bracket 228 mounted on horizontal member 198 of the frame 194. This permits a tilting of the cylinder 216 to accommodate movement of toggle 204.

In addition, it will be noted that an arm 230 is provided on upright 196 through which extends a threaded member 232 cooperating with a lock nut 234, the purpose of all of which is to provide a mechanical stop or abutment for the toggle 204 to prevent the same from going past dead center. Also to be noted are lateral extensions or arms 236 and 238 respectively mounted on arm 230 and upright 196 and the purpose of which will become hereinafter apparent.

Appearing in FIGS. 5-8 is a threadably adjusted element or bolt 240 extending vertically upwards from upright 196 and the purpose of which will also be hereinafter explained.

Mounted on top of the upright 170 of the frame 168 is a second rack 242 provided with a rectilinear series of teeth 244. These teeth are equal in pitch to the teeth 186 on rack 184 and thus to that of teeth 188 on pinion 180. These teeth 244 mesh with teeth 246 provided in rectilinear alignment in the block 248 at the top of upright 170. Rack 242 is held such that teeth 244 are engaged with teeth 246 by means of a cover 250 held in position by threaded members 252 and 254. Rack 242 is accordingly adjustable as indicated by arrow 256 through distances which are integral multiples of the pitch of the teeth 186 of rack 184.

The element 240 atop upright 196 is intended to engage with the bottom of rack 242 in order to limit the upward displacement of frame 194 under the control of jack 202. The possibility of threaded adjustment of element 240 throughout a range of at least one pitch provides for positionally synchronizing the abutment constituted by rack 242 with the supports of rack 184 and as a consequence, the magnitude of displacement of frame 194 and thus of rack 184. Consequently, the drive of pinion 180 can be achieved not only generally by control of jack 202, but more precisely by positioning of the rack 242. Moreover, as a feature of the invention, adjustment of rack 244 is in increments related to the pitch of teeth 186 to avoid any problem in engaging and disengaging rack 184 with respect to pinion 180, as will become apparent hereinafter.

Also mounted on frame 168 are switches 258 and 260 from which extend arms 262 and 264 supporting rollers 266 and 268. These rollers, as will be seen hereinafter, are intended to control sequentially the operation of cylinder 216 and jack 202, such that when rack 184 has reached the desired upper end of its stroke, piston 220 is withdrawn as shown in FIG. 8 to operate toggle 204 to withdraw rack 184 from engagement with pinion 180 and next to withdraw piston 200 into jack 202 to cause a withdrawal of frame 194. However, the one of these switches which controls toggle 204 operates through a delay circuit 269a and a valve control 269b (see FIG. 6) to maintain the toggle condition illustrated in FIG. 5 for a controllable period of time to prevent inertial movement of the chain and backlash.

As a result of the above, rack 184 is first driven upwardly through a precisely fixed distance in engagement with pinion 180 and, when the desired drive is effected and the delay of circuit 269a has expired, the rack 184 is withdrawn from the pinion and returned to its bottommost position by a movement during which the rack is disengaged from said pinion. The aforesaid delay is important to prevent forward inertial movement of the chain and backlash.

When the rack is at its lowermost position, arm 238 will engage a fixed switch 270 which will cause presure fluid to be fed to cylinder 216 in such a manner that toggle 204 is returned to the position illustrated in FIG. 5 and the teeth of rack 184 will once again be engaged with pinion 180. This engagement is readily made without any misalignment of teeth due to the above-described relationship between the racks 184 and 242.

Rotation of pinion 180 causes a concommitant rotation of gear 182 which in turn operates to rotate one or more gears 272 and/or 274 which in turn rotate the chain drives associated therewith.

Relative to the first described embodiment of the invention, it will now be clear that there is provided an apparatus for driving a conveyor wherein two devices such as a rack and pinion are selectively engaged, one of these devices being driven or oscillated in such a manner as to drive the associated conveyor in a unidirectional manner. It will also be clear that the devices are disengaged during one direction of movement comprised by the oscillatory action and are engaged in the other direction. Accordingly, the devices are only engaged during alternate oscillatory movements of one of the devices such as, for example, the rack.

While there has been illustrated a disengagement of the rack from the pinion, which remains generally stationary aside from the rotary movement thereof, it is contemplated within the scope of the invention that it is possible to disengage the pinion axially from the rack which thus retains a fixed orientation and need not be displaced transversely of its path of movement. The embodiment of the invention relating to the axial displacement of the pinion is illustrated in FIGS. 9 and 10 which, moreover illustrate an arrangement by means of which the rack is adjustably coupled to the related jack.

Figure 9:
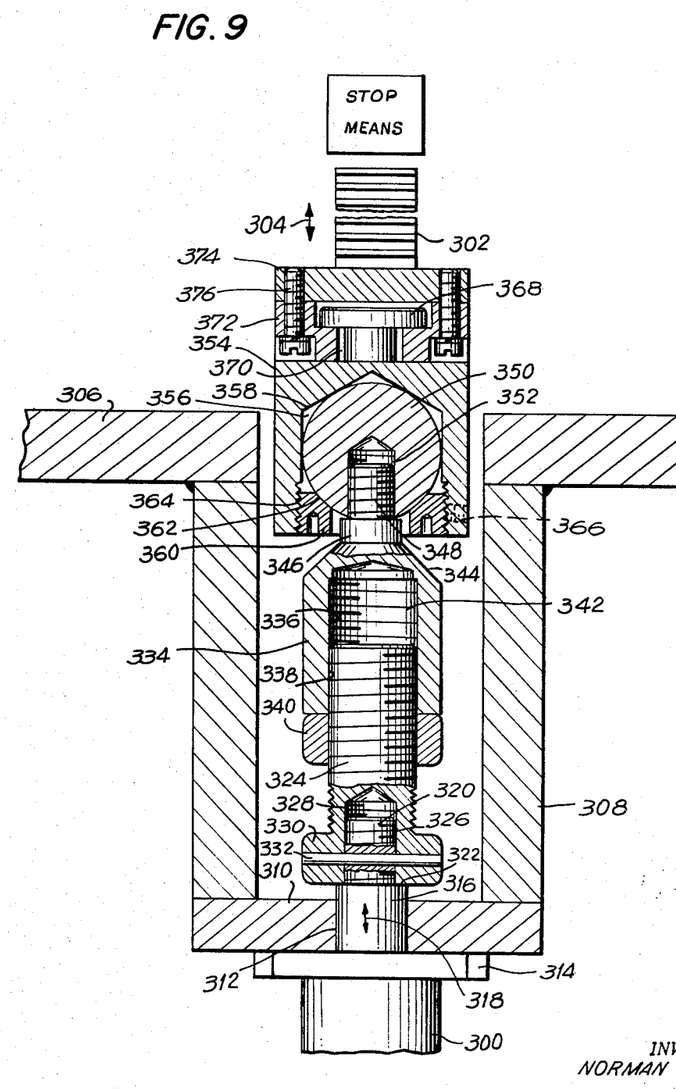
FIGURES 9 and 10 illustrate a second embodiment of the invention, FIG. 9 being a side view of a part of a rack mount and drive, FIG. 10 being a front view of a mount and control for a pinion selectively engageable with said rack.
Figure 10:
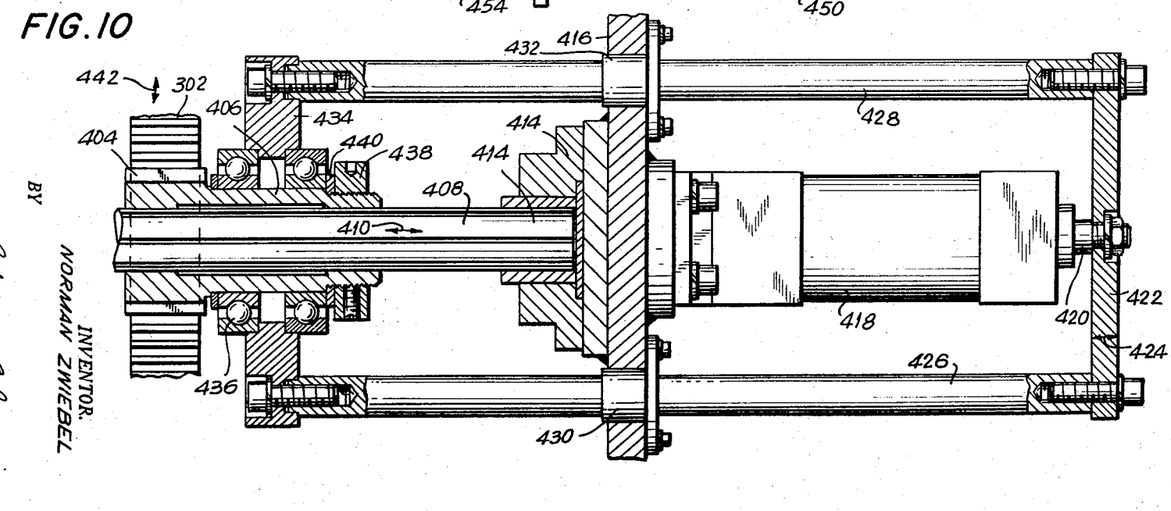

More particularly, in FIG. 9 are illustrated a jack 300 and a rack 302 connected to said jack by a structure which will next be described in greater detail whereby an oscillatory movement is imparted to the rack 302 in the direction indicated by arrow 304. In FIG. 9 appears a stationary frame element 306 to which a smaller frame 308 is connected, frame 308 comprising crosspiece 310 having opening 312 therein. Jack 300 is stationarily supported on the crosspiece 312 by means of a collar 314 and other structural elements (not shown). Piston rod 316 connected to the piston (not shown) within the jack 300 extends through opening 312 and is oscillated or reciprocated by pressure fluid fed to the jack 300 in the directions indicated by arrow 318.

The outer extremity 320 of piston rod 316 is of reduced diameter and defines with the rod 316 a shoulder 322. A generally cylindrical member 324 is provided with an end bore 326 by means of which threaded engagement is made with extremity 320 as indicated at 328. In addition, member 324 is provided with an enlarged collar 330 which seats against shoulder 322, a pin 332 extending diametrally through collar 330 and through extremity 320 to provide for a firm connection with the rod 316.

A collar 334 of generally cylindrical shape is provided with an internally threaded bore 336. Threaded engagement is therefore possible with the thread 338 provided on the exterior of member 324. A lock nut 340 also threadably engaged on the external thread 338 of member 324 provides for a firm connection between elements 324 and 334. Depending upon the adjustment of these two members, a smaller or larger chamber 342 will be found within the combined structure.

Member 334 has a tapered upper extremity as indicated at 344 which supports thereon a short rod-like extension 346 having a threaded rod 348 extending therefrom. A ball 350 is provided with a threaded bore 352 for threaded engagement with rod 348 whereby ball 350 is connected in rigid relationship through the intermediary of the various members described above to the piston rod 316.

A box 354 is provided with a chamber 356 within which ball 350 is accommodated and the chamber 356 is provided with sloped walls 358 whereby universal adjustment is possible between box 354 and ball 350.

A collar 360 encircles rod 346 and part of ball 350 and is provided with an arcuate seat 362 which is adapted for engaging against ball 350. Collar 360 is threadably engaged within bore 354 as indicated at 364. To lock the collar in position there is provided a set screw 366. Accordingly, to provide for adjustment of the box 354, set screw 366 may be loosened and collar 360 unscrewed until the desired attitude of box 354 or ball 350 is obtained whereupon collar 360 is tightened and set in position by the use of screw 366. On top of the box 354 is mounted a button head 368 extending through a slot 370 defined by elements 372 to which a crosspiece 374 is connected by means of bolts 376. The use of this latter construction permits a translational adjustment of crosspiece 374 relative to box 354, this translational adjustment applying to the rack 302 which is rigidly connected with crosspiece 374.

From what has been stated above, it will now be understood that there are a wide variety of adjustments permissible in respect of the position of rack 302 relative to piston rod 316. This facilitates adjusting rack 302 for a very precise and smooth working engagement with the associated pinion.

FIG. 10 illustrates the rack 302 in engagement with pinion 404. The pinion includes integral therewith a cylindrical extension 406 having splined engagement with the shaft 408. The pinion 404 and shaft 408 are locked together for common rotary movement, but due to the splined engagement, the pinion 404 is axially displaceable on said shaft in the directions indicated by the arrow 410. The shaft 408 is stationary in an axial sense and movement of the pinion 404, as has been indicated, is effective to detach the pinion from rack 302 according to the requirements of the conveyor drive.

Extremity 412 of shaft 410 is accommodated in a ball 414 which is mounted on fixed frame member 416. Also mounted on frame member 416 is a jack 418 which is coaxially aligned with the shaft 408 as well as pinion 404. The jack 418 includes a piston rod 420 connected inside of jack 418 with a piston (not shown) and externally connected with a cross piece 422 so as to impart to the latter an oscillatory or reciprocal movement indicated by arrow 424. Rods 426 and 428 are connected to crosspiece 422 and extend through bushings 430 and 432 mounted in frame member 416 to positions adjacent pinion 404.

Rods 426 and 428 cooperatively support a crosspiece 434 which in turn supports a bearing 436. The bearing 436 rotatably accommodates the cylindrical extension 406 on the pinion 404 but the bearing and extension are locked together for common axial displacement by means of threaded collar 438 and washer 440.

By means of supplying a pressure medium to the jack 418 in the manner which has been indicated hereinabove relative to FIGS. 3–8, the piston rod 420 and crosspiece 422 are caused to oscillate to and fro in the direction illustrated by arrow 424. This carries along rods 426 and therefore bearing 436. This in turn selectively engages or disengages pinion 404 with respect to rack 302 whose movement is indicated by arrow 442.

From what has been described hereinabove, it will be appreciated that when the rack 302 moves in one predetermined direction, pinion 404 will be engaged with the rack under the control of jack 418. When the rack 302 moves in the opposite direction, pinion 404 will be disengaged therefrom. As a result, shaft 408 will be incrementally rotated in one direction only since, during that movement of rack 302 which would normally cause a return rotation of shaft 408, the rack and pinion are disengaged.

From what has been stated above, it will now appear that the invention provides apparatus for driving a conveyor in which an oscillating or reciprocable driving means is detached from the driven element during alternate strokes or cycles of an oscillatory or reciprocable movement. In the preferred case, these elements are constituted by a rack and pinion one of which is selectively given a movement of disengagement relative to the other in order to provide a unidirectional drive.

In the latter embodiment of the invention, as well as in the first described embodiment of the invention, the meshing of the teeth of the rack and pinion is of great importance especially upon renewed engagement of these elements. To this end, the same stopping mechanism may be employed for the embodiments of FIGS. 9 and 10 as was heretofore described in respect of FIGS. 3–8. In other words, the displacement magnitude of the rack is always made in terms of integral multiples of the pitch of the teeth of the rack or the pinion so that on re-engagement of these two elements a smooth interdigitation of the teeth of these two elements takes place. More particularly, a stop mechanism for use with the apparatus of FIGS. 9 and 10 appears in FIG. 11, wherein are seen the rack 302 and pinion 404.

Figure 11:
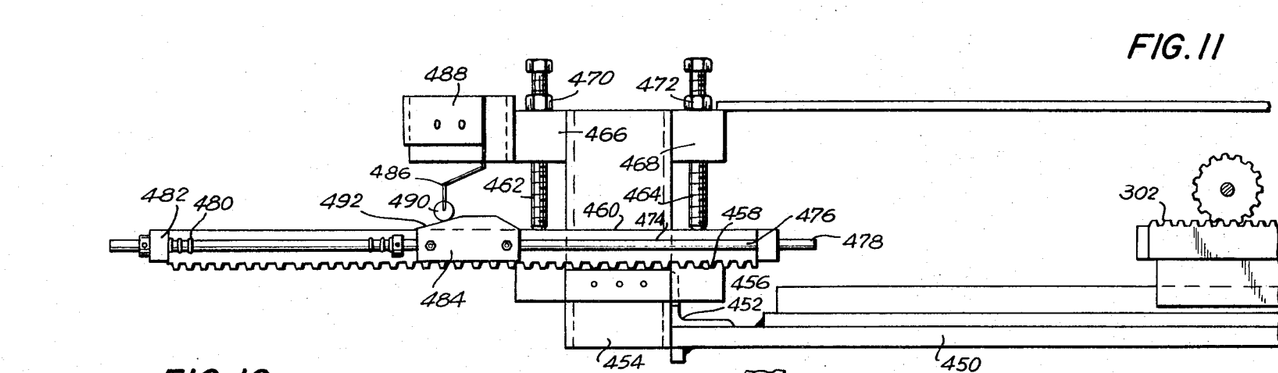
FIGURE 11 shows a stop device used with the apparatus of FIGS. 9 and 10.

The stationary reference in FIG. 11 is the frame 450 which supports an angle 452 and a block 454 which in turn supports a fixed rack 456. Rack 456 is provided with teeth 458 having the same pitch as the teeth on rack 302 and on pinion 404. Engaged with the fixed rack 456 is the adjustable rack 460, the teeth of which are of the same pitch as those of rack 456.

The rack 460 is longitudinally adjustable with respect to the rack 456. To this end rack 460 is held in position by threaded bolts 462 and 464, which are threadably engaged in blocks 466 and 468 respectively, these blocks in turn being mounted on block 454. Bolts 462 and 464 are provided with lock nuts 470 and 472 and are capable of being unscrewed from the illustrated position so that rack 460 can be withdrawn from rack 466 and displaced in one direction or the other towards or away from rack 302.

Rack 460 is provided with a longitudinal bore 474 through which extends a longitudinally displaceable rod 476, the extremity of which is engaged by the rack 302 at one limit of travel of the latter. Rod 476 is resiliently loaded by spring 480 which abuts at one end against a fixed block 482 through which rod 474 also extends. The normal position of rod 476 is as illustrated in FIG. 11, the rod being forced through block 460 by action of rack 302. A cam 484 is mounted on rod 476 and travels with the latter to operate a lever 486 or a switch 488. A roller 490 may be employed to engage the sloped face 492 of said cam.

In operation, when rack 302 travels towards the rack 460, it is first intercepted by extremity 478 of rod 476 which is thus displaced by the action of rack 302. The cam 484 traveling with rod 476 actuates switch 488, the switch 488 being used to control a valve (not shown) which controls the flow of pressure medium to the jack controlling the action of rack 302. Preferably, the arrangement is such that the movement of rack 302 is slowed through the use of switch 488 so that a full impact of the rack 302 against the rack 460 is never realized.

As in the first described form of rack stop, the adjustable rack is adjustable in increments corresponding to the pitch of the teeth on rack 302 and pinion 404 so that a ready engagement of the rack and pinion is possible for reverse reciprocal movement.

What is claimed is:

1. Apparatus comprising a drive gear, a shaft supporting said drive gear for rotation, a rack including a rectilinear alignment of teeth adapted to engage and drive said gear, and drive means to drive said rack to drive said gear, said drive means including a mobile frame pivotally supporting said rack for movement into and out of engagement with said gear, a jack including a reciprocable element supporting said frame and adapted to displace the latter whereby the rack is enabled to drive said gear, a rack toggle coupled between said rack and frame and adapted to pivot the rack into and out of engagement with said gear, piston and cylinder means mounted on said frame and coupled to said rack toggle to control the latter to pivot said rack, an adjustable control rack adjustably supported in the path of movement of said frame to limit movement thereof, and switch means operatively coupled to said jack and to said piston and cylinder means and being effective to cause the piston and cylinder means to operate the rack toggle to withdraw the first said rack from said gear and to reciprocate said reciprocable element and therefore said mobile frame in a return direction whereby said first rack is reciprocated in opposite directions respectively in and out of engagement with said gear.

2. Apparatus as claimed in claim 1 comprising means coupled to said switch means to delay withdrawing the first said rack from said gear.

3. Apparatus as claimed in claim 1, wherein said adjustable control rack includes a rectilinear alignment of teeth of the same pitch as the first said teeth, said apparatus further including means to support the control rack and to adjust the same incrementally according to the pitch of the teeth thereof whereby the first said rack is displaceable through a distance which is a multiple of said pitch.

4. Apparatus as claimed in claim 3 comprising an adjustably extending member on the mobile frame to engage said control rack to limit movement to the mobile frame.

5. Apparatus as claimed in claim 1, wherein said switch means includes at least two switches positioned to be operated sequentially by said mobile frame and controlling first the withdrawal of the first said rack from said gear and subsequently the reciprocating of the reciprocable element.

6. Apparatus as claimed in claim 1 comprising means adjustably connecting the mobile frame to said reciprocable element.

7. Apparatus as claimed in claim 1, wherein said piston and cylinder means is a double acting piston and cylinder device.

8. Apparatus as claimed in claim 1, comprising means pivotally supporting the piston and cylinder means on said mobile frame.

9. Apparatus as claimed in claim 1, wherein the toggle includes two pivotally connected links of equal length, said links respectively being connected to said mobile frame and to the first said rack.

10. Apparatus as claimed in claim 9 comprising means on the mobile frame to limit movement of the toggle.

11. Apparatus as claimed in claim 10 comprising means coupled to said switch means to delay withdrawing the first said rack from said gear.

12. Apparatus as claimed in claim 10, wherein, with the links rectilinearly aligned, the toggle is fully extended and the first said rack is engaged with said gear.

13. Apparatus as claimed in claim 11 comprising means coupled to said switch means to delay withdrawing the first said rack from said gear.

14. Apparatus for driving a conveyor comprising first and second means one of which is coupled to the conveyor and the other of which is oscillatable in reverse directions, means for selectively engaging said first and second means together during movement of said other means in one of said directions whereby the means coupled to the conveyor drives the latter unidirectionally, a source of power to drive the oscillatable means, stop means to limit the magnitude of oscillation of the oscillatable means whereby to control the extent to which the conveyor is driven during each oscillation, the first and second means collectively comprising a rack and pinion adapted for being engaged in driving relation, the source of power being a jack connected to said rack and imparting oscillatory movements to the latter, said stop means being disposed in the path of movement of the rack to limit movement of the rack, and control means to disengage the rack and pinion during alternate oscillatory movements of the rack, said pinion and rack including teeth of corresponding pitch and said stop means including adjustable means adjustable incrementally in correspondence with said pitch.

15. Apparatus comprising a rack, a jack, connecting means connecting said jack to said rack whereby the latter can be reciprocably driven, a pinion adapted for engagement with said rack, a shaft having splined engagement with said pinion whereby the latter is axially displaceable on the shaft, a cylinder, a piston rod displaceable relative to said cylinder, coupling means connecting the piston rod to said pinion whereby the pinion is displaced along the shaft into and out of engagement with said rack, and stop means for limiting the displacement of the rack relative to said jack, the rack and pinion including teeth of corresponding pitch and said stop means including adjustable means incrementally adjustable according to said pitch.

16. Apparatus as claimed in claim 15, wherein said connecting means includes a universal ball joint means between said rack and jack.

17. Apparatus as claimed in claim 16, wherein said connecting means includes a threaded adjustment means between said rack and jack.

18. Apparatus as claimed in claim 17, wherein said connecting means includes translational adjusting means between said rack and jack.

19. Apparatus as claimed in claim 15, wherein said coupling means includes a bearing, a framework coupling said bearing to said piston rod, said bearing encircling said shaft and rotatably accommodating said pinion, and means axially locking the bearing and pinion together.

20. Apparatus as claimed in claim 15, wherein said stop means includes a fixed rack, an adjustable rack, and means to hold the adjustable rack detachably against said fixed rack, said fixed and adjustable racks including interengaged teeth of the same pitch as the first said rack.

21. Apparatus as claimed in claim 20, wherein the adjustable rack is located in the path of movement of the first said rack and is oriented for endwise engagement with the latter.

22. Apparatus as claimed in claim 21 comprising a rod displacebly extending through said adjustable rack, a spring resiliently urging the latter said rod out of the adjustable rack to intercept the first said rack before it moves against the adjustable rack, and means on the rod to control the operation of said jack, according to displacement of the latter said rod.

23. In combination with apparatus for driving a conveyor and comprising first and second means one of which is coupled to the conveyor and the other of which is oscillatable in reverse directions, means for selectively engaging said first and second means together during movement of said other means in one of said directions whereby the means coupled to the conveyor drives the latter unidirectionally, a source of power to drive the oscillatable means, and stop means to limit the magnitude of oscillation of the oscillatable means whereby to control the extent to which the conveyor is driven during each oscillation; apparatus for the processing of a sheet of thermoplastic material, comprising means for connecting said sheet to said conveyor, heating means operatively associated with said conveyor for heating said sheet, forming means for forming three-dimensional objects in said sheet after the heating thereof, cutting means for partially severing said objects from said sheet, stacking means for pushing the partially severed objects from the sheet, and removal means for cuting off portions of the sheet after said objects have been removed from the same, said apparatus for driving the conveyor driving the sheet in exact registration through the stacking and removal means.

References Cited

UNITED STATES PATENTS

| | | | |
|---|---|---|---|
| 105,464 | 7/1870 | Klein | 198—178 |
| 1,085,538 | 1/1914 | Burgess | 198—178 |
| 2,926,674 | 4/1960 | Umbricht | 198—135 |
| 2,940,327 | 6/1960 | Gartner | 198—135 |
| 3,085,452 | 4/1963 | Thompson | 74—130 |
| 3,124,010 | 3/1964 | Eady | 74—130 |
| 3,222,971 | 12/1965 | Gerletz | 83—218 |
| 3,277,224 | 10/1966 | Whiteford | 264—160 |

RICHARD E. AEGERTER, *Primary Examiner.*